United States Patent
Ucar et al.

(10) Patent No.: US 12,456,371 B2
(45) Date of Patent: Oct. 28, 2025

(54) TRAFFIC MANAGEMENT AFTER AN INITIAL CONFLICT EVENT

(71) Applicant: TOYOTA MOTOR ENGINEERING & MANUFACTURING NORTH AMERICA, INC., Plano, TX (US)

(72) Inventors: Seyhan Ucar, Mountain View, CA (US); Emrah Akin Sisbot, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 18/436,458

(22) Filed: Feb. 8, 2024

(65) Prior Publication Data
US 2025/0259539 A1    Aug. 14, 2025

(51) Int. Cl.
*G08G 1/09* (2006.01)
*G08G 1/01* (2006.01)

(52) U.S. Cl.
CPC ............. *G08G 1/09* (2013.01); *G08G 1/0133* (2013.01)

(58) Field of Classification Search
CPC ................................ G08G 1/09; G08G 1/0133
See application file for complete search history.

(56) References Cited

U.S. PATENT DOCUMENTS

| | | | |
|---|---|---|---|
| 8,423,250 B2 | 4/2013 | Kondou | |
| 8,786,421 B2 | 7/2014 | Dozza | |
| 9,207,095 B2 | 12/2015 | Gunther | |
| 9,638,537 B2 | 5/2017 | Abramson | |
| 9,736,650 B2 | 8/2017 | Beaurepaire | |
| 10,365,115 B2* | 7/2019 | Nair | G08G 1/0145 |
| 10,446,035 B2 | 10/2019 | Nishimura | |
| 10,688,990 B2 | 6/2020 | Kim | |
| 11,069,234 B1* | 7/2021 | Mulligan | G08G 1/087 |
| 11,380,198 B2 | 7/2022 | Ucar | |
| 11,414,088 B2 | 8/2022 | Ucar | |
| 11,436,922 B2 | 9/2022 | Vadillo | |
| 11,548,515 B2 | 1/2023 | Ucar | |
| 11,840,256 B2* | 12/2023 | Quirynen | G08G 1/0112 |
| 12,264,928 B2* | 4/2025 | Farooq | G01C 21/3691 |

(Continued)

FOREIGN PATENT DOCUMENTS

| | | |
|---|---|---|
| CN | 104176054 | 12/2014 |
| EP | 2539197 | 1/2013 |

*Primary Examiner* — Hussein Elchanti
(74) *Attorney, Agent, or Firm* — SHEPPARD, MULLIN, RICHTER & HAMPTON LLP; Daniel N. Yannuzzi

(57) ABSTRACT

Systems and methods are provided for programmatically determining traffic management operations in response to conflicts on a roadway. For example, the systems and methods may determine a first traffic management instruction for a first vehicle for a first conflict on a roadway; access characteristics of the first vehicle associated with the first management instruction in response to the first conflict; determine a second conflict occurring after and connected to the first conflict; using the characteristics of the first vehicle, determine a second traffic management instruction for the first vehicle for the second conflict; and provide the second traffic management instruction to the first vehicle.

20 Claims, 10 Drawing Sheets

(56) References Cited

U.S. PATENT DOCUMENTS

| | | |
|---|---|---|
| 2015/0141043 A1 | 5/2015 | Abramson |
| 2017/0234691 A1 | 8/2017 | Abramson |
| 2019/0086219 A1* | 3/2019 | Hashisho ............. G05D 1/0223 |
| 2019/0122178 A1* | 4/2019 | Kempf ........... G06Q 10/063114 |
| 2019/0122548 A1* | 4/2019 | Sakuma ................... G08G 1/08 |
| 2019/0180617 A1* | 6/2019 | Hori ................. B60W 50/0097 |
| 2019/0228593 A1* | 7/2019 | Liu ................. G08G 1/096872 |
| 2020/0184238 A1* | 6/2020 | Kobayashi ........... G06V 40/161 |
| 2022/0068122 A1 | 3/2022 | Ucar |
| 2022/0375348 A1 | 11/2022 | Ucar |

* cited by examiner

TRAFFIC MANAGEMENT AFTER AN INITIAL CONFLICT EVENT

TECHNICAL FIELD

The present disclosure relates generally to providing traffic management instructions after a first conflict event amongst connected or non-connected vehicles operated on a roadway, and, when a second conflict event is predicted that is interdependent with the first conflict event, providing traffic management instructions to help prevent the second conflict event.

DESCRIPTION OF RELATED ART

Some autonomous driving systems analyze objects in a roadway in which the vehicle (e.g., the ego vehicle) is traveling. The objects may be moveable objects, like other vehicles and drivers, or immovable objects like traffic lights and stop signs. When an object is acting without regard to the expected procedure, the vehicle may determine that the object is an anomaly. The object may be an anomaly by performing actions that are done in an unusual time (e.g., relative to a typical time for a particular geographic location) or an unusual location (e.g., relative to a typical location). For example, a vehicle that is exhibiting anomalous behavior includes performing an unusual action that does not typically occur or infrequently occurs relative to the types of actions that are typical for a particular geographic location. An occurrence of a vehicle exhibiting anomalous behavior in a roadway environment may jeopardize safety of various roadway participants (e.g., vehicles, drivers, passengers, pedestrians, bikers, etc.) and may reduce the overall efficiency of a transportation system.

BRIEF SUMMARY OF THE DISCLOSURE

Anomaly detection in vehicles operating on a roadway is beneficial to improving safety on roadways, reducing injuries, and improving efficiency of operating vehicles in the environment. Some examples of abnormal driving may include aggressive driving (e.g., tailgating, cut-in lane, etc.), distracted driving (e.g., swerving, delayed reaction, etc.), and reckless driving (e.g., green light running, lane change without signaling, etc.). A vehicle operating on the roadway may be equipped with anomaly detection (e.g., the ego vehicle) and determine predicted operations (e.g., from modeling or other predicted values, including predicted distance to the nearby other vehicle through the backup camera) that are generated from the sensor data to detect an identification of abnormal driving by other vehicles. Some anomaly detection systems can verify an origin of abnormal driving and provide an instruction to other vehicles to operate differently based on the cause of the anomaly.

The anomalous behavior may correspond with a first conflict on the roadway. In addition to anomalous behavior of drivers on the roadway, the first conflict on the roadway may correspond with traffic management. For example, in traffic management associated with a road hazard, the system may detect a fallen object and proactively instruct the approaching vehicles to change lanes. The instructions may help divert traffic from the lane where the fallen object is located to other lanes. In traffic management associated with roadway congestion, the system may detect recurring and non-recurring traffic congestion and generate instructions to clear the lanes where the congestion is located. Generated traffic management instructions include detours, lane changes, and speed advisories. The main intention of these systems is to help the vehicles pass the congested location smoothly and resume normal traffic patterns.

The system that provides the instruction to operate the ego vehicle may be remote from the ego vehicle. For example, the ego vehicle may collect and transmit various characteristics of vehicles, drivers, or vehicle sensor data to the remote system. The remote system may also collect data from infrastructure elements of the roadway. These characteristics may include distance, speed, etc. of the vehicles or other data from a set of sensors (e.g., camera, radar) from the ego vehicle that measures other vehicles in the roadway. Vehicles can use Vehicle-to-X communication to transmit the metadata to the remote system and initiate the verification for the origin of abnormal driving (e.g., Vehicle-to-Vehicle (V2V), Vehicle-to-Infrastructure (V2I), Vehicle-to-Cloud (V2C), etc.). The remote system can determine new instructions based on the characteristics in mitigating the abnormal driving behavior.

Some systems that determine abnormal driving using anomaly detection are discussed in U.S. Pat. Nos. 11,380,198, 11,414,088, and 11,597,395, U.S. Patent Publication No. 2022/0375348, and U.S. patent Ser. No. 16/273,134, which are incorporated by reference herein in their entirety.

Once the vehicles react to the first conflict (e.g., abnormal driving or road obstruction) using the traffic management instruction, a second conflict may be predicted after the first conflict is resolved. For example, the first conflict may correspond with an impact region surrounding a vehicle exhibiting abnormal driving or a road obstruction in a particular lane of the roadway. Once the ego vehicle is outside the end impact region of the other vehicle or the obstruction, the first conflict is resolved. The second conflict may arise after the first conflict and/or may be caused by any one of the vehicle's reactions to the first conflict. For example, a set of vehicles may move to a second lane on a roadway to avoid the obstruction and, once the vehicles have passed the obstruction, the first lane may be open and available for accepting the vehicles to return to the first lane. The predicted behavior of the vehicles may be to return to the open, first lane. However, if the vehicles attempt to initiate an immediate return to the first lane together, this combination of operations can cause a second conflict after the first conflict that may be caused by avoiding or being outside the first conflict.

In this instance, the second conflict is predicted to occur based on human behavior and predicted operations of the vehicles. To help avoid a second conflict, the system may access characteristics of the vehicles in response to the first conflict and, rather than instructing all vehicles to return to the first lane at the same time, which can cause the second conflict, instruct the vehicles to perform alternative operations. For example, the first vehicle may have reacted quickly to instructions for overcoming the first conflict and the system can determine instructions for overcoming the second conflict based on quick reactions to the first conflict (e.g., compliance to implementing instructions, etc.). The system can generate additional instructions for the set of vehicles to help overcome the predicted second conflict. The system may provide the additional instructions to the vehicles that overcame the first conflict.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1:
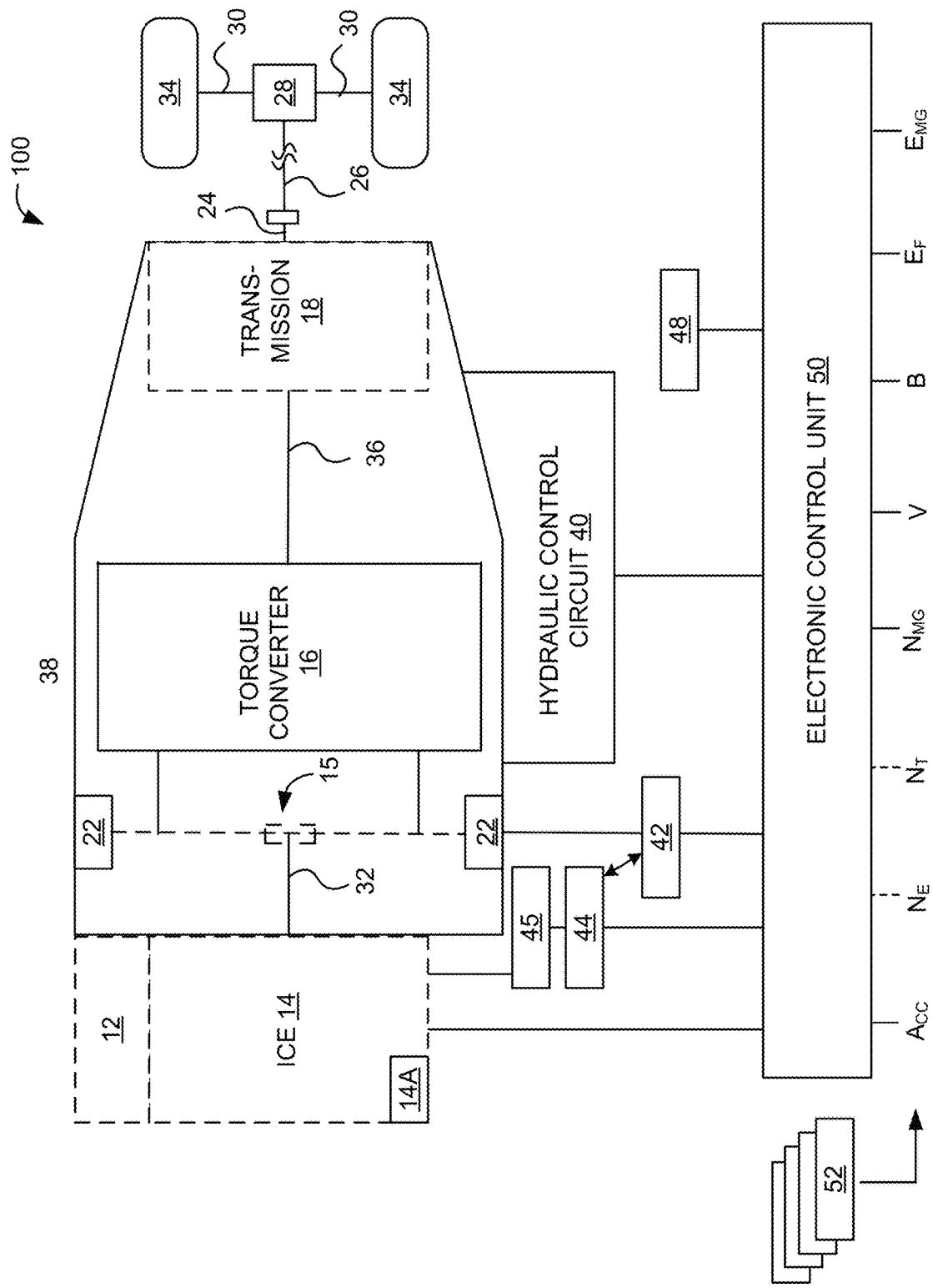
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for programmatically verifying the origin of abnormal driving can be implemented in other types of vehicles including gasoline- or diesel-powered vehicles, fuel-cell vehicles, electric vehicles, or other vehicles. Any of these vehicles may be implemented as a connected or non-connected vehicle.

FIG. 1 illustrates a drive system of vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 100 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and clutch 15 may be included to engage engine 14. In the EV travel mode, vehicle 100 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

Output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 100 and is powered electrically via battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage battery charger 45. Battery 44 may also be charged by motor 22 such as, for example, by regenerative braking or by coasting during which time motor 22 operate as generator.

Motor 22 can be powered by battery 44 to generate a motive force to move vehicle 100 and adjust vehicle speed. Motor 22 can also function as a generator to generate electrical power such as, for example, when coasting or braking. Battery 44 may also be used to power other electrical or electronic systems in vehicle 100. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

Electronic control unit 50 (described below) may be included and may control the electric drive components of vehicle 100 as well as other vehicle components. For example, electronic control unit 50 may control inverter 42, adjust driving current supplied to motor 22, and adjust the current received from motor 22 during regenerative coasting and breaking. As a more particular example, output torque of motor 22 can be increased or decreased by electronic control unit 50 through inverter 42.

Torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of vehicle 100. In the illustrated example, crankshaft 32, which is an output member of engine 14, may be selectively coupled to motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated).

When clutch 15 is engaged, power transmission is provided in the power transmission path between crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of clutch 15.

As alluded to above, vehicle 100 may include electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in vehicle 100. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more sensors 52 may include their own processing capability to compute the results for additional information that can be provided to electronic control unit 50. In other embodiments, one or more sensors 52 may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
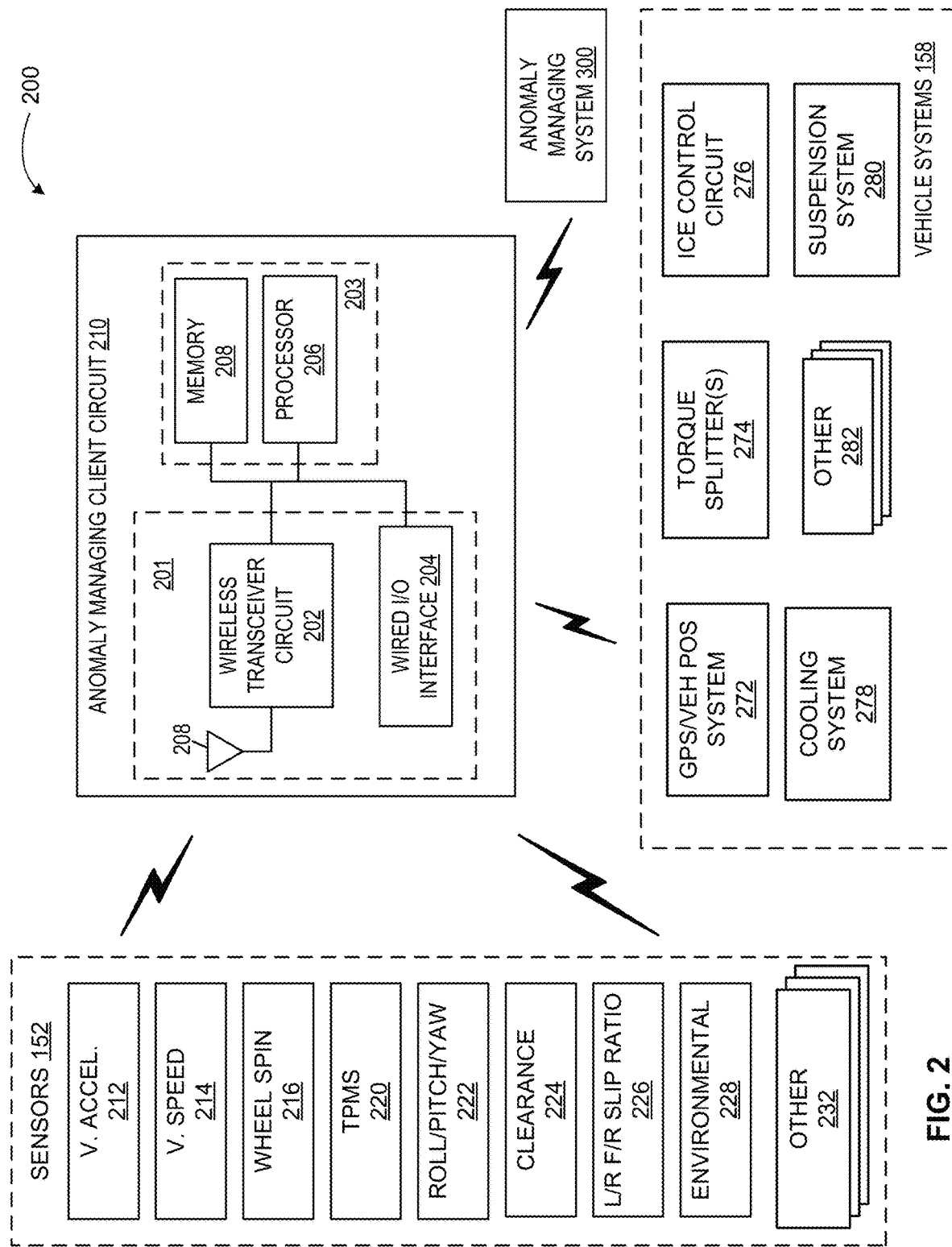
FIG. 2 illustrates an example vehicle architecture for implementing vehicle instructions in accordance with some embodiments of the systems and methods described herein.

FIG. 2 illustrates an example vehicle architecture for implementing vehicle instructions in accordance with some embodiments of the systems and methods described herein. In this example, vehicle 200 includes anomaly managing client circuit 210, sensors 152, and vehicle systems 158, in addition to or in replacement of other physical components illustrated in vehicle 100 of FIG. 1. Any of these components illustrated in FIG. 2 may electronically communicate with anomaly managing system 300, which is further described with FIG. 3.

Sensors 152 and vehicle systems 158 can communicate with anomaly managing client circuit 210 via a wired or wireless communication interface. Although sensors 152 and vehicle systems 158 are depicted as communicating with anomaly managing client circuit 210, they can also communicate with each other as well as with other vehicle systems. Anomaly managing client circuit 210 can be implemented as an ECU or as part of an ECU such as, for example electronic control unit 50 in FIG. 1. In other embodiments, anomaly managing client circuit 210 can be implemented independently of the ECU.

Anomaly managing client circuit 210, in this example, includes communication circuit 201, decision circuit 203 (including processor 206 and memory 208), and power supply (not shown). Components of anomaly managing client circuit 210 are illustrated as communicating with each other via a data bus, although other communication interfaces can be included.

Processor 206 can include one or more GPUs, CPUs, microprocessors, or any other suitable processing system. Processor 206 may include a single core or multicore processors. Memory 208 may include one or more various forms of memory or data storage (e.g., flash, RAM, etc.) that may be used to store the calibration parameters, images (analysis or historic), point parameters, instructions, and variables for processor 206 as well as any other suitable information. Memory 208, can be made up of one or more modules of one or more different types of memory, and may be configured to store data and other information as well as operational instructions that may be used by processor 206 to execute via anomaly managing client circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up anomaly managing client circuit 210.

Communication circuit 201 may comprise either or both wireless transceiver circuit 202 with antenna 208 and wired I/O interface 204 with an associated hardwired data port (not illustrated). As this example illustrates, communications with anomaly managing client circuit 210 can include either or both wired and wireless communications circuits 201. Wireless transceiver circuit 202 can include a transmitter and a receiver (not shown) to allow wireless communications via any of a number of communication protocols such as, for example, Wi-Fi®, Bluetooth®, near field communications (NFC), Zigbee®, and any of a number of other wireless communication protocols whether standardized, proprietary, open, point-to-point, networked or otherwise.

Antenna 208 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by anomaly managing client circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet® or any of a number of other wired communication protocols whether standardized, proprietary, open, point-to-point, networked or otherwise.

The power supply (incorporated with any of the features herein) can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 100, with which vehicle 200 is implemented. In the illustrated example, sensors 152 include vehicle acceleration sensors 212, vehicle speed sensors 214, wheelspin sensors 216 (e.g., one for each wheel), tire pressure monitoring system (TPMS) 220, accelerometers such as 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of vehicle 200.

In some examples, sensors 152 may also include one or more sensors that are operable to measure a roadway environment outside of vehicle 200. For example, sensors 152 may include one or more sensors that record one or more physical characteristics of the roadway environment that is proximate to vehicle 200.

In some examples, sensors 152 may also include one or more sensors that record an environment internal to a cabin of vehicle 200. For example, sensors 152 includes onboard sensors which monitor the environment of vehicle 200 whether internally or externally. In a further example, sensors 152 includes cameras, LIDAR, radars, infrared sensors, and sensors that observe the behavior of the driver such as internal cameras, biometric sensors, etc. In some examples, sensors 152 may include one or more of the following vehicle sensors: a camera; a LIDAR sensor; a radar sensor; a laser altimeter; an infrared sensor; a motion detector; a thermostat; and a sound detector. Sensors 152 may also include one or more of the following sensors: a carbon monoxide sensor; a carbon dioxide sensor; an oxygen sensor; a mass air flow sensor; and an engine coolant temperature sensor. Sensors 152 may also include one or more of the following sensors: a throttle position sensor; a crank shaft position sensor; an automobile engine sensor; a valve timer; an air-fuel ratio meter; and a blind spot meter. Sensors 152 may also include one or more of the following sensors: a curb feeler; a defect detector; a Hall effect sensor, a manifold absolute pressure sensor; a parking sensor; a radar gun; a speedometer; and a speed sensor. Sensors 152 may also include one or more of the following sensors: a tire-pressure monitoring sensor; a torque sensor; a transmission fluid temperature sensor; and a turbine speed sensor (TSS); a variable reluctance sensor; and a vehicle speed sensor (VSS). Sensors 152 may also include one or more of the following sensors: a water sensor; a wheel speed sensor; and any other type of automotive sensor.

Sensors 152 may generate sensor data. For example, the sensor data may comprise digital data describing one or more sensor measurements of sensors 152. For example, the sensor data may include vehicle data describing vehicle 200

(e.g., GPS location data, speed data, heading data, etc.), driver, and other sensor data describing a roadway environment (e.g., camera data depicting a roadway or a vehicle's proximity to other vehicles, etc.).

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, or an adjustable-damping suspension system; and other vehicle systems 282.

During operation, anomaly managing client circuit 210 can receive information from various vehicle sensors to determine whether a remote operator should be ready to operate the vehicle by performing the driving operations, or be ready to assist the driver of a semi-autonomous vehicle with a limited driving situation from afar. Communication circuit 201 can be used to transmit and receive information between anomaly managing client circuit 210 and sensors 152, and anomaly managing client circuit 210 and vehicle systems 158. Also, sensors 152 may communicate with vehicle systems 158 directly or indirectly (e.g., via communication circuit 201 or otherwise).

Figure 3:
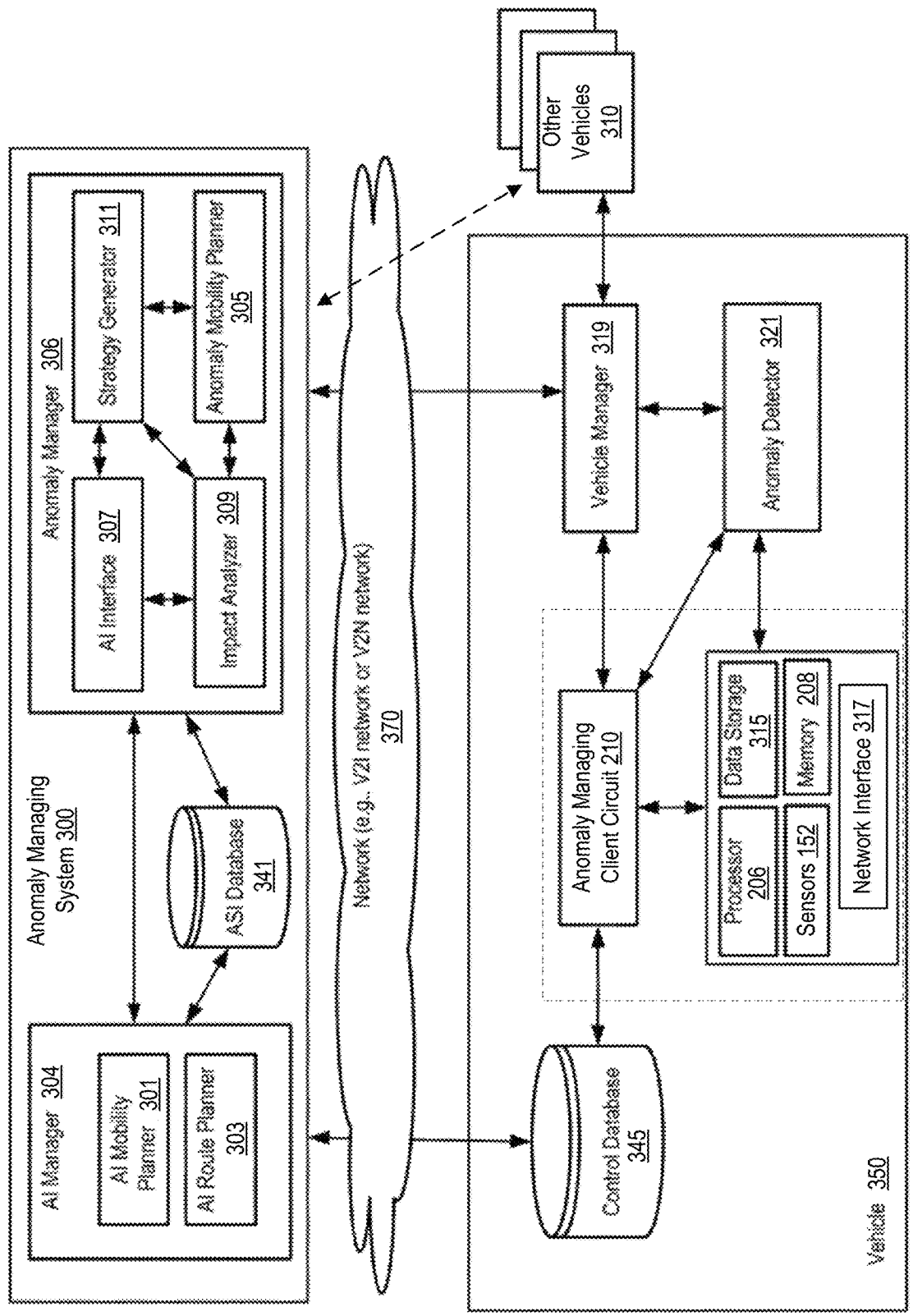
FIG. 3 is a block diagram illustrating an architecture for the anomaly managing system and the anomaly managing client according to some embodiments.

In various embodiments, communication circuit 201 can be configured to receive data and other information from sensors 152 that is used in determining to communicate with anomaly managing system 300, as described with FIG. 3. Additionally, communication circuit 201 can be used to send an activation signal or other activation information to various vehicle systems 158 as part of entering or exiting an anomaly detection and management mode, if applicable to the implemented embodiment.

FIG. 3 is a block diagram illustrating an architecture for anomaly managing system and anomaly managing client according to some embodiments. In this example, anomaly managing system 300 and anomaly managing client circuit 210 are provided. Anomaly managing system 300 may be installed in a server or cloud-based system and vehicle 350 may detect an occurrence of an anomaly as it is operating on a roadway. Vehicle 350 may be affected by the anomaly.

Anomaly managing system 300 may include software that is operable to manage an anomaly and anomaly-affected entities. In some embodiments, anomaly managing system 300 may be implemented using hardware including a field-programmable gate array ("FPGA") or an application-specific integrated circuit ("ASIC"). In some other embodiments, anomaly managing system 300 may be implemented using a combination of hardware and software. Anomaly managing system 300 may be stored in a combination of the devices (e.g., servers or other devices), or in one of the devices.

Anomaly managing system 300 may communicate with ego vehicle 350 (e.g., connected vehicle) and other vehicles 310 via network 370. In some examples, other vehicles 310 may be autonomous vehicles (no passenger and/or driver) or non-autonomous vehicles in the vicinity of a vehicle exhibiting anomalous behavior (e.g., aggressive driving). Anomaly managing system 300 may provide route management instructions (e.g., determined by AI route planner 303) to vehicles 310 that causes them to drive to where the aggressive driver is located, create a barrier for the aggressive driver, and drive in formation to track the position of the aggressive driver so that the barrier is maintained and the dynamics of the aggressive driver are reduced. Reducing the dynamics of the aggressive driver includes, for example, making it harder for the aggressive driver to change lanes or speed up without causing a collision or some other negative consequence for the aggressive driver.

Network 370 may be a wired or wireless network, and may have numerous different configurations including a star configuration, token ring configuration, or other configurations. Furthermore, network 370 may include a local area network (LAN), a wide area network (WAN) (e.g., the Internet), or other interconnected data paths across which multiple devices and/or entities may communicate. In some embodiments, network 370 may include a peer-to-peer network.

Network 370 may be coupled to or may include portions of a telecommunications network for sending data in a variety of different communication protocols. In some embodiments, network 370 includes Bluetooth® communication networks or a cellular communications network for sending and receiving data including via short messaging service (SMS) and multimedia messaging service (MMS). In some embodiments, network 370 includes networks for hypertext transfer protocol (HTTP), direct data connection, wireless application protocol (WAP), e-mail, DSRC, full-duplex wireless communication and mmWave. In some embodiments, network 370 further includes networks for WiFi (infrastructure mode), WiFi (ad-hoc mode), visible light communication, TV white space communication and satellite communication. Network 370 may also include a mobile data network that may include 3G, 4G, LTE, LTE-V2X, LTE-D2D, VoLTE, 5G-V2X or any other mobile data network. Network 370 may also include any combination of mobile data networks. Further, network 370 may include one or more IEEE 802.11 wireless networks.

Vehicle 350 includes various components in addition to or in replacement of other physical components illustrated in vehicle 100 of FIG. 1 and vehicle 200 of FIG. 2. For example, besides the elements described above with reference to FIG. 2, vehicle 350 may include data storage 315, network interface 317, control database 345, vehicle manager 319, and anomaly detector 321, as described herein.

Anomaly detector 321 may include code and routines for detecting an occurrence of an anomaly in the roadway environment. For example, anomaly detector 321 may detect the occurrence of the anomaly by performing operations described in U.S. patent application Ser. No. 16/273,134, filed on Feb. 11, 2019, titled "Anomaly Mapping by Vehicular Micro Clouds," the entirety of which is incorporated herein by reference.

Vehicle manager 319 may include code and routines for performing coordination with other vehicles 310 via V2X communications. For example, vehicle manager 319 may manage (e.g., establish and maintain) inter-vehicular wireless links and control executions of collaborative operations among vehicles 310.

Anomaly managing client circuit 210 of vehicle 350 may cause vehicle manager 319 to send sensor data recorded by vehicle 350 to anomaly managing system 300. The sensor data can be recorded by sensors 152 and forwarded to anomaly managing client circuit 210 and anomaly detector 321.

Anomaly managing client circuit 210 may also receive anomaly data describing the vehicle exhibiting anomalous behavior or a determined obstruction in the roadway from anomaly detector 321. Anomaly managing client circuit 210 may send, via vehicle manager 319, the anomaly data to anomaly managing system 300.

Anomaly managing system 300 may comprise Artificial Intelligence (AI) manager 304, ASI database 341, and anomaly manager 306. AI manager 304, in some examples, may include AI mobility planner 301 and AI route planner 303.

AI mobility planner 301 is operable to continuously monitor mobility information of connected entities (e.g., vehicles) and store current route information and predicted route information of the connected entities. AI mobility planner 301 may generate the hierarchical AI data based at least on the current route information and predicted route information of the connected entities and any other information of the connected entities (e.g., speed data, heading data, etc.).

AI route planner 303 may be operable to plan routes for the connected entities based on the hierarchical AI data. In some embodiments, AI route planner 303 may assist anomaly manager 306 to plan routes for the anomaly-affected entities responsive to the occurrence of the anomaly or other events associated with objects on the roadway.

Anomaly manager 306, in some examples, may include one or more of the following elements: anomaly mobility planner 305, AI interface 307, impact analyzer 309, and strategy generator 311.

Anomaly mobility planner 305 may be operable to monitor information of anomalies present in the roadway environment. This information may include, for example, location information, description information, and any other information related to the anomaly.

AI interface 307 may be operable to retrieve hierarchical AI data associated with the roadway environment from AI manager 304. The hierarchical AI data may order/rank objects on the roadway in association with a confidence score. The greater the confidence score, the greater likelihood that the AI manager 304 or anomaly manager 306 may predict the actions of the object and generate a response to avoid the impact of those actions. AI interface 307 may receive the hierarchical AI data and send predictions associated with the data to other components of vehicle 350, other vehicles 310, or back to the anomaly managing system 300 for further analysis.

Impact analyzer 309 may be operable to determine an impact of the anomaly. Impact analyzer 309 may also determine an influence region or impact region of the anomaly based on one or more roadway condition parameters and the impact of the anomaly. Impact analyzer 309 determines a set of anomaly severity indices associated with a set of sub-regions within the influence region.

In some embodiments, the anomaly data and the set of anomaly severity indices are stored in ASI database 341. The anomaly data may be associated with timestamps to help determine actions over time and generate corresponding predictions.

Strategy generator 311 may be operable to manage anomaly-affected entities within the influence region based on the set of anomaly severity indices. For example, for each sub-region from the set of sub-regions, strategy generator 311 identifies, one or more anomaly-affected entities within the sub-region. Strategy generator 311 generates a corresponding control strategy to manage the one or more anomaly-affected entities in the sub-region based on a corresponding anomaly severity index associated with the sub-region. Strategy generator 311 instructs the one or more anomaly-affected entities in the sub-region to execute the corresponding control strategy. As a result, strategy generator 311 generates a set of control strategy to manage anomaly-affected entities in the influence region based on the set of anomaly severity indices.

For example, with respect to vehicle 350 which is affected by the anomaly, strategy generator 311 identifies that vehicle 350 is present within a particular sub-region that is associated with a particular anomaly severity index. Strategy generator 311 generates a control strategy for vehicle 350 based on the particular anomaly severity index. Strategy generator 311 sends strategy data describing the control strategy to vehicle 350. After receiving the strategy data, anomaly managing client circuit 210 of vehicle 350 may store the strategy data in control database 345. Anomaly managing client circuit 210 may inform vehicle manager 319 about the received strategy data. Anomaly managing client circuit 210 ensures that vehicle manager 319 follows the control strategy described by the strategy data so that vehicle 350 operates in accordance with the control strategy to mitigate an effect of the anomaly. For example, assume that the control strategy instructs vehicle 350 to change a lane immediately. Then, vehicle manager 319 can modify an operation of an ADAS system of vehicle 350 so that the ADAS system controls vehicle 350 to change its lane immediately.

Figure 4:
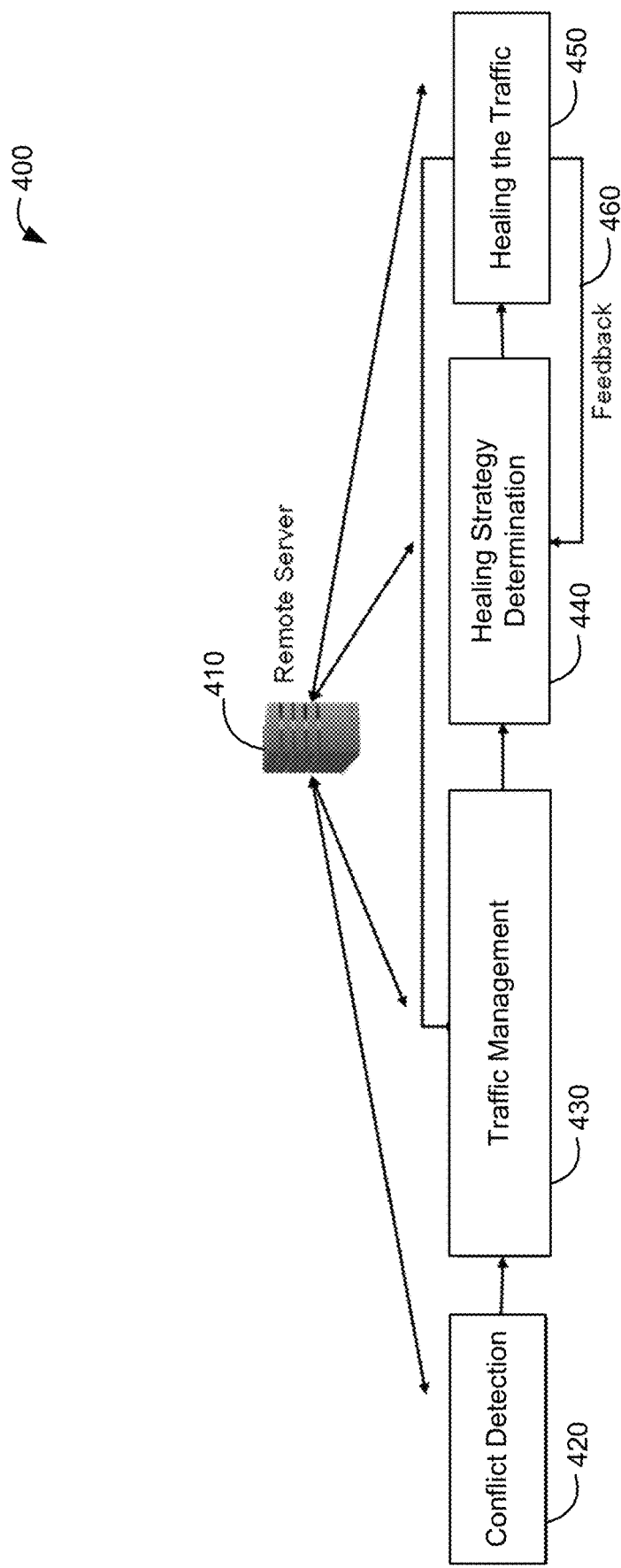
FIG. 4 is a process for providing traffic management according to some embodiments.

FIG. 4 is a process for providing traffic management according to some embodiments. In example 400, the traffic management system may be operated as server 410 or combination of devices with anomaly managing system 300 illustrated in FIG. 3. Traffic management system may perform a series of operations and transmit instructions to ego vehicle. Ego vehicle may correspond with vehicle 350 illustrated in FIG. 3 or other vehicles described herein.

At block 420, an event/situation is detected by server 410 on a roadway in association with a first conflict. The event/situation may include ego vehicle. Server 410 may determine characteristics of the vehicles and drivers involved in the event/situation by receiving data directly from the vehicles (if they are connected vehicles), from other connected vehicles that are adjacent to the non-connected vehicles, or from infrastructure components of the roadway.

In some examples, the conflict includes cases where the traffic management is triggered. Some examples of cases where the traffic management is triggered may include when the ego vehicle can detect unsafe driving behavior of other vehicles, or when server 410 can use information from multiple vehicles and detect unsafe driving at a remote level. In some examples, the conflict may correspond with a fallen objects, jam tail, or queue that is detected from sensor data or other data associated with the roadway.

At block 430, the system provides traffic management. For example, the system may provide instructions to avoid the abnormal/unsafe driving or move into different lanes of the roadway to avoid the fallen object. As an illustrative example, the ego vehicle detects unsafe driving of the second vehicle on the roadway, and the ego vehicle and server 410 may help guide the ego vehicle to be away from the second vehicle (e.g., as the aggressive driver). In another illustrative example, the server 410 detects a fallen object and guides drivers slow down and divert traffic from the fallen object lane to other lanes.

As part of the traffic management in response to the conflict, the system may also determine actions performed by the vehicles. For example, the system may analyze the characteristics of drivers while traffic management is operating. The characteristics may correspond with operations of the vehicles that are measured through sensor data or surrounding/other vehicles, characteristics of the drivers (e.g., accuracy or speed for implementing the instruction as being in compliance with the instruction), or other data.

At block 440, the system determines a healing strategy. For example, the system may infer the characteristic of drivers (e.g., compliance rate is high and impact is high) and the characteristics of the traffic management. The system may combine the characteristics of traffic management (e.g., aggressive/abnormal driving or road hazard management, etc.) and characteristics of the drivers. The system may select a particular type of healing strategy (e.g., zipper-type healing or first apply first served healing) in accordance with the determined characteristics.

In some examples, the healing strategy may be determined by two factors, including the characteristics of the traffic management and the characteristics of the driver/vehicle. The healing strategy may be determined by considering the factors and determining the healing strategy for the traffic without causing any conflict among drivers.

In some examples, the characteristics of the traffic management may comprise a management type and an impact region. The management type may correspond with a target objective(s) of the applied management strategy (e.g., to reduce risk of collision under unsafe rear vehicles) and an impact region of the traffic management (e.g., how impactful the conflict/event is).

Various illustrations of traffic management are provided. For example, when a second vehicle is performing anomalous driving operations as distracted driver swerving within the lane or otherwise performing unsafe driving maneuvers, the impact region is medium and the impact of the conflict/event may be low. In another example, when drivers are operating in response to traffic management, the compliance rate may be high. In another example, when a second vehicle is performing anomalous driving operations as a distracted driver, the impact region is high and the impact of the conflict/event may be low.

In some examples, the characteristics of the driver may comprise a compliance rate, a driver type, and a vehicle type. The compliance rate may correspond with a value that measures how compliant the driver applied the given guidance in traffic management. The driver type may correspond with a value that measure the overall driver type such as whether the driver is a conservative/anxious driver or whether the driver is an impatient driver. The vehicle type may correspond with a vehicle type (e.g., SUV, truck, etc.).

The healing strategy may correspond with various methods. For example, the healing strategy may correspond with zipper-type healing, first apply first served healing, out-of-impact region first healing, or compliant drivers first healing. Additional detail on each of these healing strategies is provided with FIG. 5.

At block 450, the system heals the traffic. For example, after determination of healing strategy, the system (e.g., via server 410) may transmit instructions to the ego vehicle 350 and other vehicles 310, as available, to help guide vehicles accordingly in implementing the healing strategy. In some examples, server 410 may guide the vehicles accordingly and track the guided vehicles. It may initiate a feedback loop to transmit instructions and receive additional characteristics of the roadway, drivers, or vehicles.

At block 460, the system receives feedback from the healing strategy determination. The system may also track the operations of the guided vehicles in response to providing the instructions (e.g., to determine a compliance score or additional operations performed by the vehicles after the instruction is provided). The system may determine additional instructions (e.g., as recurring or non-recurring traffic management) through the feedback loop. In some examples, the feedback is returned to the healing model that is based on a machine learning (ML) model, artificial intelligence (AI), or a time series where time-ordered events are applied one by one. The process may update the healing model for future healing strategy determinations. Additional detail on the feedback loop is provided with FIG. 5.

Figure 5:
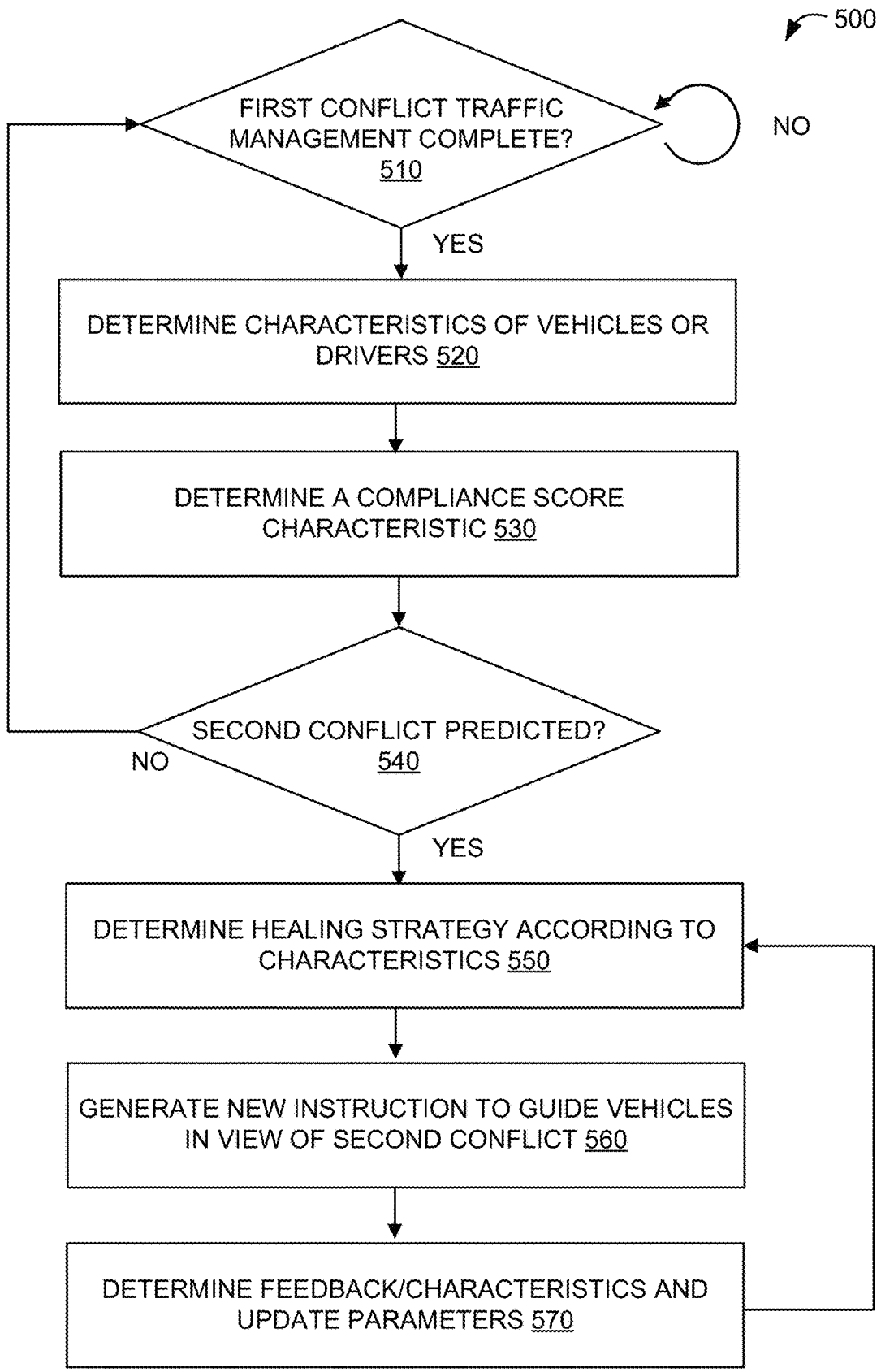
FIG. 5 is a process for providing traffic management according to some embodiments.

FIG. 5 is a process for providing traffic management according to some embodiments. In example 500, the system may receive various characteristics on the roadway to determine recurring or non-recurring instructions for vehicle operations. In some examples, the process may be implemented at anomaly managing system 300 of FIG. 3 or server 410 of FIG. 4, or a combination of server 410, anomaly managing system 300, and other devices, and the ego vehicle may correspond with vehicle 100 of FIG. 1, vehicle 200 of FIG. 2, or vehicle 350 of FIG. 3.

At block 510, the process includes determining whether the traffic management is complete from the first conflict. In some examples, the traffic management is complete from the first conflict when the impact region of the vehicle or obstruction causing the first conflict has been passed by the ego vehicle and other vehicles on the roadway. As an illustrative example, the vehicle causing the first conflict may have passed the first vehicle at a high rate of speed and no longer causing a conflict to the ego vehicle, or the ego vehicle may have passed the static obstruction that had caused the first conflict and no longer causing a conflict to the ego vehicle. In either of these instances, the impact region of the vehicle/obstruction is no longer affecting the ego vehicle such that the ego vehicle would need to adjust operations in response to avoiding the vehicle/obstruction.

As discussed herein, the system may determine and provide a first traffic management instruction for a first vehicle for a first conflict on the roadway. The first conflict may be associated with a second vehicle that is exhibiting anomalous behavior or identifying an obstruction in the roadway that should be avoided by other vehicles. In some examples, the ego vehicle or other vehicles may be identified by transmitting sensor data from the vehicle to anomaly managing system to determine whether the vehicle has complied with the instruction. A corresponding compliance score may be determined for a set of vehicles on the roadway.

In some examples, the first conflict may correspond with recurring traffic congestion. The instruction corresponding with the first conflict that is recurring may also be recurring, for example, to clear the lane where the traffic congestion is occurring. As illustrated herein, the traffic may be non-recurring traffic and may correspond with a recurring instruction, which should not limit the scope of the disclosure. The instruction may include, for example, detouring some of the vehicles on alternate routes, providing lane change suggestions/instructions, or providing speed advisories to inform the vehicles of the upcoming traffic congestion.

At block 520, the process may determine characteristics of the vehicles or drivers on the roadway. For example, the system may access characteristics of the first vehicle associated with the first management instruction in response to the first conflict.

The characteristics may comprise characteristics of the driver. The characteristics may include the overall driver type such as conservative/anxious driver, or whether the driver is impatient, each of which are determined by data collected from sensors associated with the vehicle or roadway infrastructure, as illustrated with sensors 52 in FIG. 1 or sensors 152 in FIG. 2 which include cameras, LIDAR, radars, infrared sensors, and sensors that observe the behavior of the driver such as internal cameras, biometric sensors, etc.

The characteristics may comprise characteristics of the vehicle. The characteristics may include the type of vehicle such as SUV, semi-truck, or other features of the vehicle that can affect acceleration speed, steering accuracy, control, agility, or other operations of the vehicle in response to the conflict. The characteristics of the vehicle may include whether the vehicle is an electric vehicle or non-electric, which may affect the acceleration rate of the vehicle, or whether the vehicle is autonomous or semi-autonomous. In some examples, the characteristics of the vehicle may be collected using sensors described throughout the disclosure, including sensors 52 in FIG. 1 or sensors 152 in FIG. 2 which include vehicle sensors: a camera; a LIDAR sensor; a radar sensor; a laser altimeter; an infrared detector; a motion detector; a thermostat; a sound detector; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; and a speed sensor.

In some examples, the driver/vehicle characteristics may correspond with timing. For example, the transmission of the instruction may be sent at a first time and the operation changes performed by the vehicle may be detected at a second time. The difference between the first time and the second time may be measured and used to determine the relative compliance score of the driver/vehicle in implementing the instruction, which may be stored as a characteristic of the driver/vehicle.

In some examples, the characteristics may comprise a management type. For example, the management type may adjust a target objective(s) of the applied management strategy and may be selected as a predetermined value from an administrative user or other application provided by the remote server. One illustrative management type is to reduce the risk of collision of anomalous/unsafe vehicles. Another traffic management objective is to adjust an impact region (e.g., an area of impact surrounding a vehicle exhibiting anomalous behavior), including determining how the system will adjust the instruction to the ego vehicle in response to the event/situation and in relation to the impact region.

The impact region may be measured around the vehicle exhibiting the anomalous behavior or around the object providing the obstruction to the roadway. The impact region may identify an area around the vehicle/obstruction where other vehicles should avoid in order to perform safer operations around the obstruction to prevent the predicted second conflict. The impact region may be expanded based on the speed that the vehicle/object Is traveling. The impact region may be reduced based on the speed that the vehicles (including the ego vehicle) is traveling around the obstructive object/vehicle, such that the impact region is larger based on a speed of the vehicle above a threshold value and the impact region is smaller based on the speed being below the threshold vehicle or the objection being static/unmovable. The impact region may be a numerical scale (e.g., 0-100) or a categorical scale (e.g., "low," "medium," "high").

At block 530, the process may determine a compliance score associated with the first conflict. The compliance score of the driver corresponds with the driver's predicted or actual response in responding to the first management instruction provided in response to the first conflict. The compliance score may measure how compliant the driver applied the given traffic management instruction in traffic management or how well the vehicle or driver performs or complies with the operations identified in the instruction.

The compliance score may be a numerical scale (e.g., 0-100) or a categorical scale (e.g., "Compliant," "Partially Compliant," "Non-Compliant"). The compliance score be determined by comparing the characteristics of the vehicle (e.g., location, speed, proximity to other vehicles, etc.) with the characteristics of the traffic management instruction provided in response to the first conflict. This might involve comparing measured operations of the vehicle against a checklist or set of benchmarks identified in the instruction. When the characteristics of the vehicle are within a threshold value of the characteristics of the instruction (e.g., 90%), the system may determine that the vehicle/driver is compliant with the instruction. The compliance score may be generated above a threshold compliance value (e.g., 75%) to identify that the vehicle/driver is compliant with the instruction using the numerical scale (e.g., 0-100) or a categorical scale (e.g., "Compliant," "Partially Compliant," "Non-Compliant").

In some examples, the compliance score may be weighted. The weight of the compliance score may be adjusted based on one or more geographic locations (e.g., a location at which the device or vehicle is traveling or in a particular lane of a roadway when the user is being directed to exit), or a speed of the vehicle (e.g., a speed at which the vehicle is traveling, for example, if the vehicle is traveling at 50 miles per hour and is expected to stop shortly). Additionally, the instruction may be compared with a geographic location of the vehicle to determine that the operation is relatively less likely to be complied with (e.g., by determining that the device is considerably distant from the location of the operation, such that it is unlikely that the operation will be performed). In some examples, particular operations may be weighted higher/lower based on the relatively to which they are less likely to be complied with (e.g., a turn, a stop, a start, a forward/reverse direction change, a continuation of a previous/current operation, a lane change, a previously performed operation, an exit, or other operation).

At block 540, the process may determine if there is a predicted or potential for a second conflict after the first conflict. If yes, the process may proceed to block 550. If no, the process may return to block 510.

The second conflict may be predicted to occur after the first conflict and may be connected to or interdependent with the first conflict. The second conflict may be predicted to occur when characteristics of the roadway or vehicles are present after the first conflict is resolved and the first vehicle is outside an impact region of the first conflict. This may include, for example, a first lane with a number of vehicles above a first threshold value and a second lane with a number of vehicles below a second threshold value, when a driver exhibiting anomalous behavior leaves a set of vehicles beyond a threshold distance, when a roadway obstruction is past a set of vehicles beyond a threshold distance, or other features. In these examples, the impact region of the vehicle/obstruction has passed the ego vehicle that has adjusted its operation in response to the vehicle/obstruction and traffic management instruction from the system.

As an illustrative example, a set of vehicles may move to a second lane on a roadway to avoid the obstruction and, once the vehicles have passed the obstruction, the first lane may be open and available for accepting the vehicles to return to the first lane. The predicted behavior of the vehicles may be to return to the open, first lane. However, if the vehicles attempt to initiate an immediate return to the first lane together, this combination of operations can cause a second conflict after the first conflict. In this instance and similar instances, the process may predict an occurrence of the second conflict.

At block 550, the process may determine a healing strategy according to the characteristics. Various healing strategies are available. For example, the system may determine instructions to implement zipper-type healing. The zipper-type healing may provide a set of instructions to multiple vehicles on the roadway. The instructions may instruct one vehicle at a time to move to a different lane when driver compliance is high, and the impact of unsafe driving is low.

In another example, the system may determine instructions to implement first-applied, first-served healing. The first-applied, first-served healing may provide a set of instructions to multiple vehicles on the roadway. The instructions may instruct one vehicle at a time to move vehicles according to drivers' order of compliance in the guidance in management. For example, the compliance score of each driver/vehicle may be determined. The vehicle with the greatest compliance score that is operating outside of the impact region of the vehicle exhibiting the unsafe driving is instructed to return to the lane, followed by the vehicle with the next greatest score, and so on. The instructions may include an order for the vehicles to return to the lane that corresponds with order of compliance of the vehicles response to the first conflict.

In another example, the system may determine instructions to implement distance-based healing. The distance-based healing may provide a set of instructions to multiple vehicles on the roadway. The instructions may instruct one vehicle at a time to move vehicles according to wait time after being out of impact region.

In another example, the system may determine instructions to implement compliance-based healing for sequential movement. The compliance-based healing may provide a set of instructions to multiple vehicles on the roadway. The instructions may instruct one vehicle at a time to move compliant drivers first to propagate the healing strategy to non-compliant drivers. The instructions of each vehicle may be adjusted in case there are multiple compliant and non-compliant drivers.

In these examples, including zipper-type healing, first-applied, first-served healing, distance-based healing, and compliance-based healing for sequential movement, the instructions may include an order for the vehicles to perform the operations. The order of the vehicles may be sorted based on the compliance score, distance from the impact region of the vehicle/obstruction, or other characteristics. In some examples, the instructions may be transmitted concurrently or sequentially, and each of the instructions may instruct the vehicle to operate in accordance with actions of other vehicles (e.g., move back to the first lane after the car in front of you, etc.).

The healing strategy may be selected based on a healing model or other selection process. For example, the healing model may be based on machine learning (ML), artificial intelligence (AI), or a time series where time-ordered events are selected/applied one by one. For example, the healing model may receive vehicle/driver characteristics of the vehicles that are present around the vehicle exhibiting the anomalous behavior, the impact region of the vehicle exhibiting the anomalous behavior, as well as the compliance scores for the drivers in response to the first conflict. In some examples, an administrative user can provide human assistance to select the healing strategy. The user can access the system to select the healing strategy or issue a remote command to initiate selection of the healing strategy.

In an illustrative example, the vehicle exhibiting anomalous behavior may be ongoing and the impact region is medium. When the compliance score of the ego vehicle or other vehicles is high, the process may determine a zipper-type healing strategy to move vehicles one at a time after the unsafe vehicle has passed and the impact region surrounding the vehicle is past the ego vehicle. In another illustrative example, the system may instruct vehicles to return to the lane after the impact region has passed or low. The vehicles may be prioritized/ordered/sorted to return to the lane given the timing and speed at which the vehicles applied the instruction in response to the first conflict, so that vehicles can move in order of compliance At block 560, the process may generate a new instruction to guide vehicles after the first conflict and when the second conflict is predicted to occur. The new instruction may be provided in anticipation for avoiding the predicted second conflict or in response to identifying that the second conflict will likely exists or currently exists. The instruction may correspond with the healing strategies discussed herein (e.g., zipper-type healing, first-applied, first-served healing, distance-based healing, or compliance-based healing for sequential movement) and may be provided to the ego vehicle using a network like Vehicle-to-X communication network (e.g., Vehicle-to-Vehicle (V2V), Vehicle-to-Infrastructure (V2I), Vehicle-to-Cloud (V2C), etc.) to transmit the data.

At block 570, the process may determine feedback or characteristics of the vehicles/drivers and update the parameters (e.g., healing model, healing strategy, compliance score calculation, or other determination). Based on the updated parameters, the system may revise the process or final determination of the healing strategy based on the feedback. In some examples, the feedback may be provided as a loop or recurring feedback. For example, the process may determine the feedback based on the selected healing strategy for the first conflict or the characteristics of vehicles/drivers that are measured after the instructions are transmitted for the second conflict. The process may measure the ability of the instructions to avoid the second conflict that was predicted and increase the confidence score of the instruction with respect to the healing model. When the healing model is activated in the future for a new conflict, the healing strategy may have a higher selection rate or a higher confidence score based on the ability of the instruction to help avoid the second conflict in the past.

Figure 6:
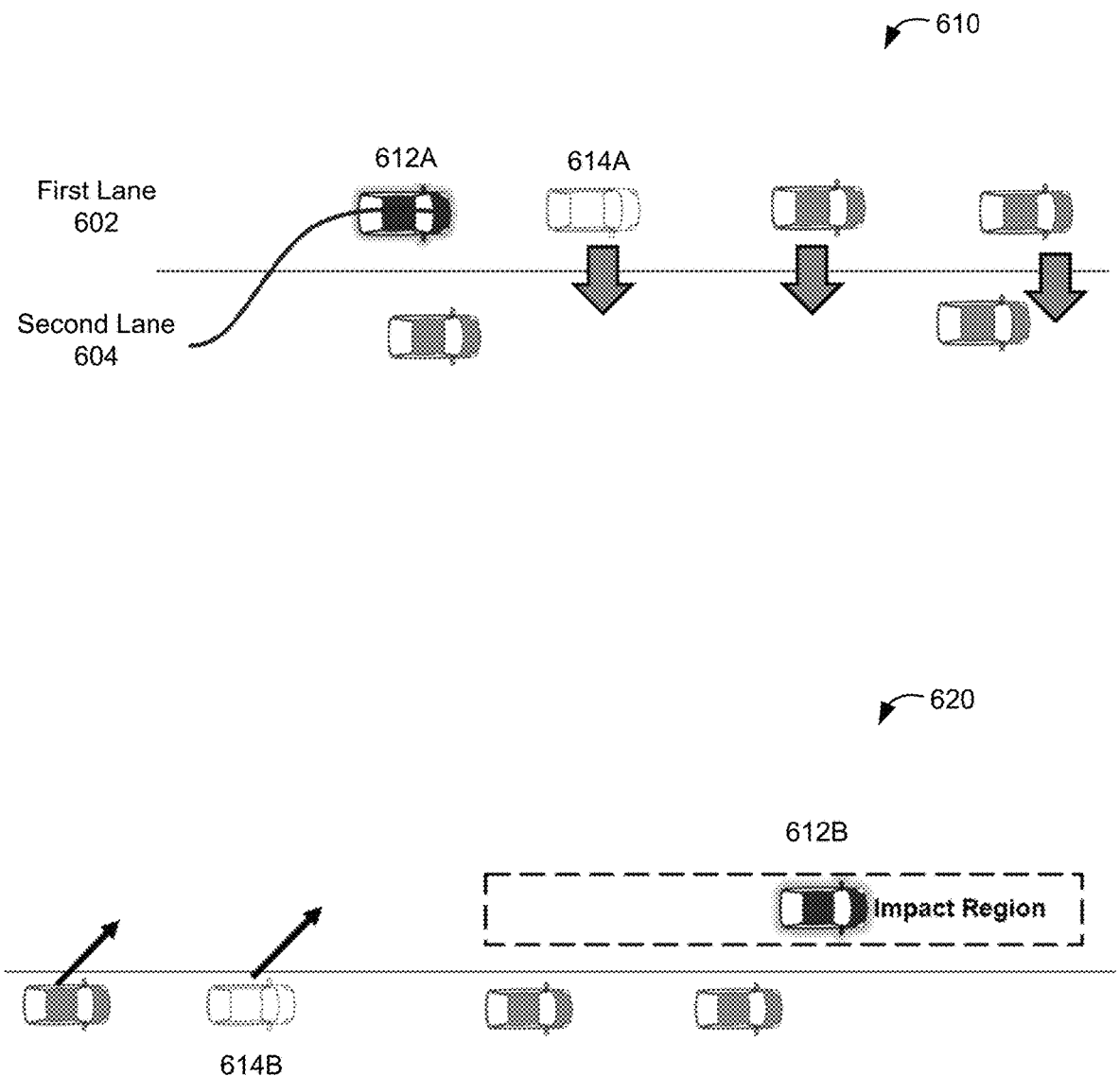
FIG. 6 illustrates a set of vehicles that implement vehicle instructions in response to a conflict issue in accordance with some embodiments of the systems and methods described herein.

FIG. 6 illustrates a set of vehicles that implement vehicle instructions in response to a conflict issue in accordance with some embodiments of the systems and methods described herein. In some examples, the traffic management process may be implemented by server 410 or combination of devices with anomaly managing system 300 illustrated in FIG. 3 and the ego vehicle may correspond with vehicle 100 of FIG. 1, vehicle 200 of FIG. 2, or vehicle 350 of FIG. 3. The traffic management system may perform a series of operations and transmit instructions to ego vehicle or other vehicles described herein.

At block 610 and at a first time, vehicles are operating in two lanes, including first lane 602 and second lane 604. In first lane 602, vehicle 612A may be exhibiting anomalous behavior and ego vehicle 614A is in front of vehicle 612 in first lane 602. These interactions may be associated with a first conflict. The system may attempt to reduce the risk of a collision between ego vehicle 614A and vehicle 612A in response to the anomalous behavior of vehicle 612A and instruct ego vehicle 614A to change lanes to avoid a collision with vehicle 612A and allow vehicle 612A to pass. The instruction may be transmitted to ego vehicle 614A and other vehicles to move the vehicles into second lane 604.

At block 620 and at a second time, ego vehicle 614B and other vehicles have moved to second lane 604 to avoid the collision with vehicle 612B and ego vehicle 614B intends to move back to first lane 602. The first lane 602 remains empty at the second time. The predicted behavior of the vehicles in the second lane 604 is to return to the first lane 602 that is empty, so the system predicts that this behavior may cause another collision, referred to second conflict. The system may predict that the vehicles would return to the first lane when the first conflict event/situation is no longer present, and preemptively instruct the vehicles to return to the first lane using various strategies for returning to the first lane.

In some examples, the impact region of vehicle 612B may be determined to help determine the healing strategy to preempt the second conflict. When the impact region passes the set of vehicles, the system may determine the order for providing the instruction to the vehicles to return to the first lane. In this example, the compliance score may be used to determine the order of which vehicles should return to first lane 602, corresponding with the compliance-based healing strategy for sequential movement.

Figure 7:
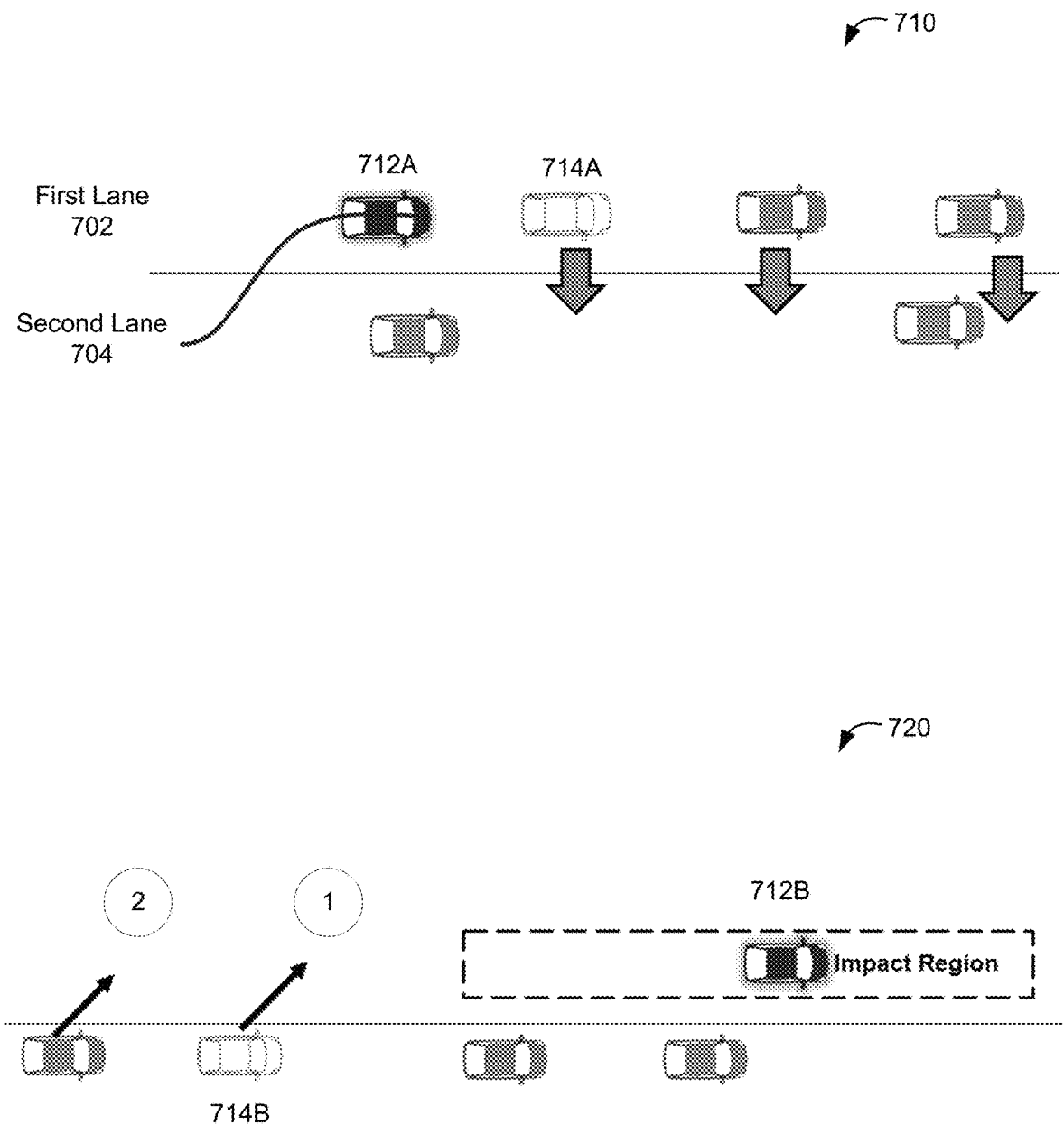
FIG. 7 illustrates a set of vehicles that implement vehicle instructions in response to a conflict issue in accordance with some embodiments of the systems and methods described herein.

FIG. 7 illustrates a set of vehicles that implement vehicle instructions in response to a conflict issue in accordance with some embodiments of the systems and methods described herein. In some examples, the traffic management process may be implemented by server 410 or combination of devices with anomaly managing system 300 illustrated in FIG. 3 and the ego vehicle may correspond with vehicle 100 of FIG. 1, vehicle 200 of FIG. 2, or vehicle 350 of FIG. 3. The traffic management system may perform a series of operations and transmit instructions to ego vehicle or other vehicles described herein.

At block 710 and at a first time, vehicles are operating in two lanes, including first lane 702 and second lane 704. In first lane 702, vehicle 712A may be exhibiting anomalous behavior and ego vehicle 714A is in front of vehicle 712A in first lane 702. These interactions may be associated with a first conflict. The system may attempt to reduce the risk of a collision between ego vehicle 714A and vehicle 712A in response to the anomalous behavior of vehicle 712A and instruct ego vehicle 714A to change lanes to avoid a collision with vehicle 712A and allow vehicle 712A to pass. The instruction may be transmitted to ego vehicle 714A and other vehicles to move the vehicles into second lane 704.

At block 720 and at a second time, ego vehicle 714B and other vehicles have moved to second lane 704 to avoid the collision with vehicle 712B and ego vehicle 714B intends to move back to first lane 702. The first lane 702 remains empty at the second time. The predicted behavior of the vehicles in the second lane 704 is to return to the first lane 702 that is empty, so the system predicts that this behavior may cause another collision, referred to second conflict. The system may predict that the vehicles would return to the first lane when the first conflict event/situation is no longer present, and preemptively instruct the vehicles to return to the first lane using various strategies for returning to the first lane.

In some examples, the impact region of vehicle 712B may be determined to help determine the healing strategy to preempt the second conflict. When the impact region passes the set of vehicles, the system may determine the order for providing the instruction to the vehicles to return to the first lane. In this example, the compliance score may be used to determine the order of which vehicles should return to first lane 702, corresponding with the healing strategy of first-applied, first-served healing. In some examples, the compliance score of the vehicle that applies the instruction first-in-time may be higher than other vehicles that also apply the instruction. The vehicles that apply the instruction first-in-time may be instructed to return to the second lane 704 before the vehicles that applied the instruction at a later time.

Figure 8:
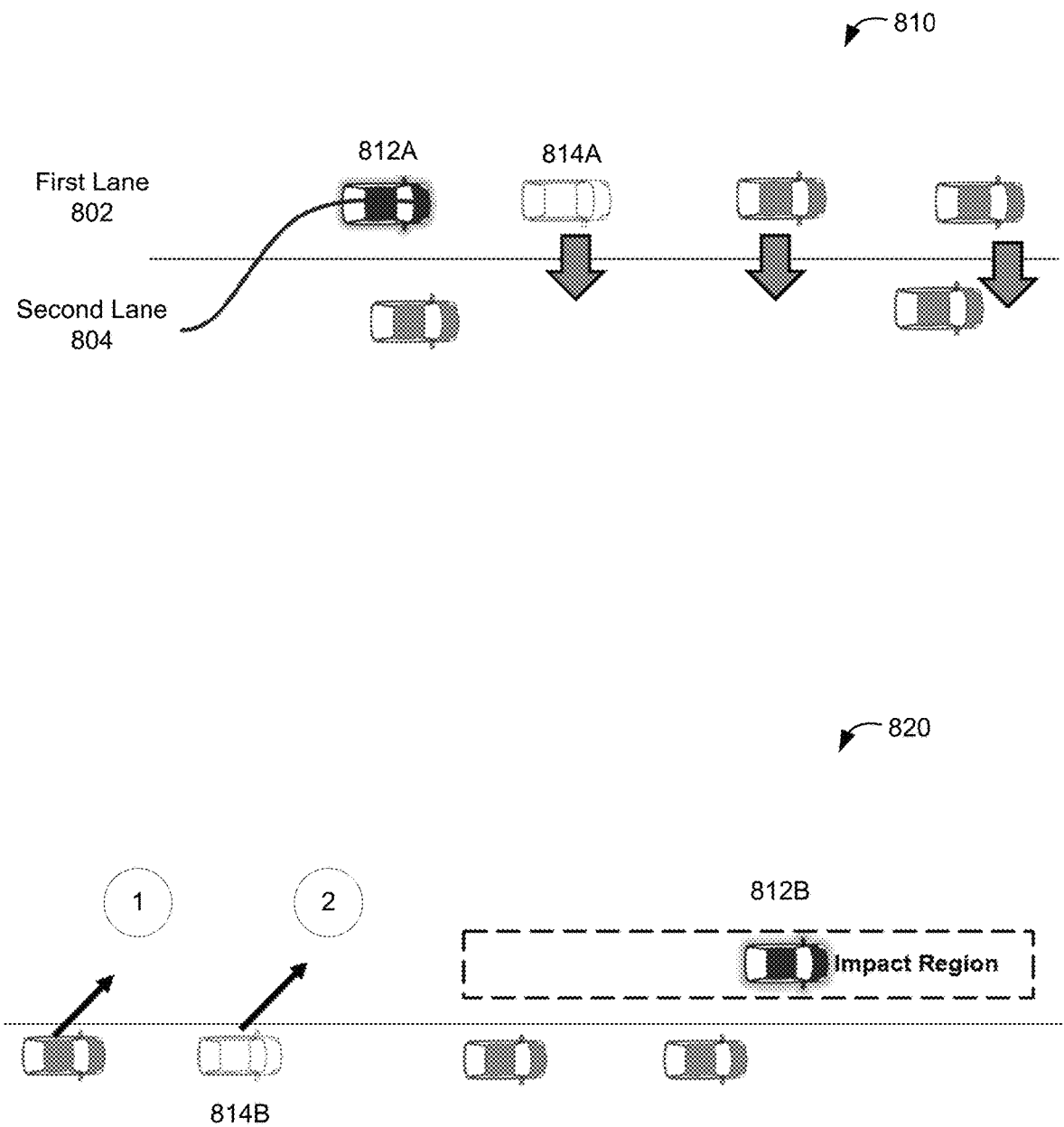
FIG. 8 illustrates a set of vehicles that implement vehicle instructions in response to a conflict issue in accordance with some embodiments of the systems and methods described herein.

FIG. 8 illustrates a set of vehicles that implement vehicle instructions in response to a conflict issue in accordance with some embodiments of the systems and methods described herein. In some examples, the traffic management process may be implemented by server 410 or combination of devices with anomaly managing system 300 illustrated in FIG. 3 and the ego vehicle may correspond with vehicle 100 of FIG. 1, vehicle 200 of FIG. 2, or vehicle 350 of FIG. 3. The traffic management system may perform a series of operations and transmit instructions to ego vehicle or other vehicles described herein.

At block 810 and at a first time, vehicles are operating in two lanes, including first lane 802 and second lane 804. In first lane 802, vehicle 812 may be exhibiting anomalous behavior and ego vehicle 814A is in front of vehicle 812 in first lane 802. These interactions may be associated with a first conflict. The system may attempt to reduce the risk of a collision between ego vehicle 814A and vehicle 812 in response to the anomalous behavior of vehicle 812 and instruct ego vehicle 814A to change lanes to avoid a collision with vehicle 812 and allow vehicle 812 to pass. The instruction may be transmitted to ego vehicle 814A and other vehicles to move the vehicles into second lane 804.

At block 820 and at a second time, ego vehicle 814B and other vehicles have moved to second lane 604 to avoid the collision with vehicle 812B and ego vehicle 814B intends to move back to first lane 802. The first lane 802 remains empty at the second time. The predicted behavior of the vehicles in the second lane 804 is to return to the first lane 802 that is empty, so the system predicts that this behavior may cause another collision, referred to second conflict. The system may predict that the vehicles would return to the first lane when the first conflict event/situation is no longer present, and preemptively instruct the vehicles to return to the first lane using various strategies for returning to the first lane.

In some examples, the impact region of vehicle 812B may be determined to help determine the healing strategy to preempt the second conflict. When the impact region passes the set of vehicles, the system may determine the order for providing the instruction to the vehicles to return to the first lane. In this example, the distance between vehicle 812B (exhibiting the anomalous behavior) and other vehicles may be measured and the vehicles may be instructed to return when they are the farthest distance from vehicle 812B (e.g., distance-based healing process) to first lane 802, when the vehicles are outside of the impact region of vehicle 812B, or corresponding with the zipper-based healing process that instructs one vehicle at a time to move from second lane 804 back to first lane 802 when driver compliance is high and the impact of unsafe driving is low (e.g., the impact region has passed beyond a threshold distance). In some examples, the instruction may instruct ego vehicle 814B to perform an operation to comply with a distance-based healing strategy (e.g., return to the first lane 802) when the second vehicle 812B is outside of a location of the first conflict.

Figure 9:
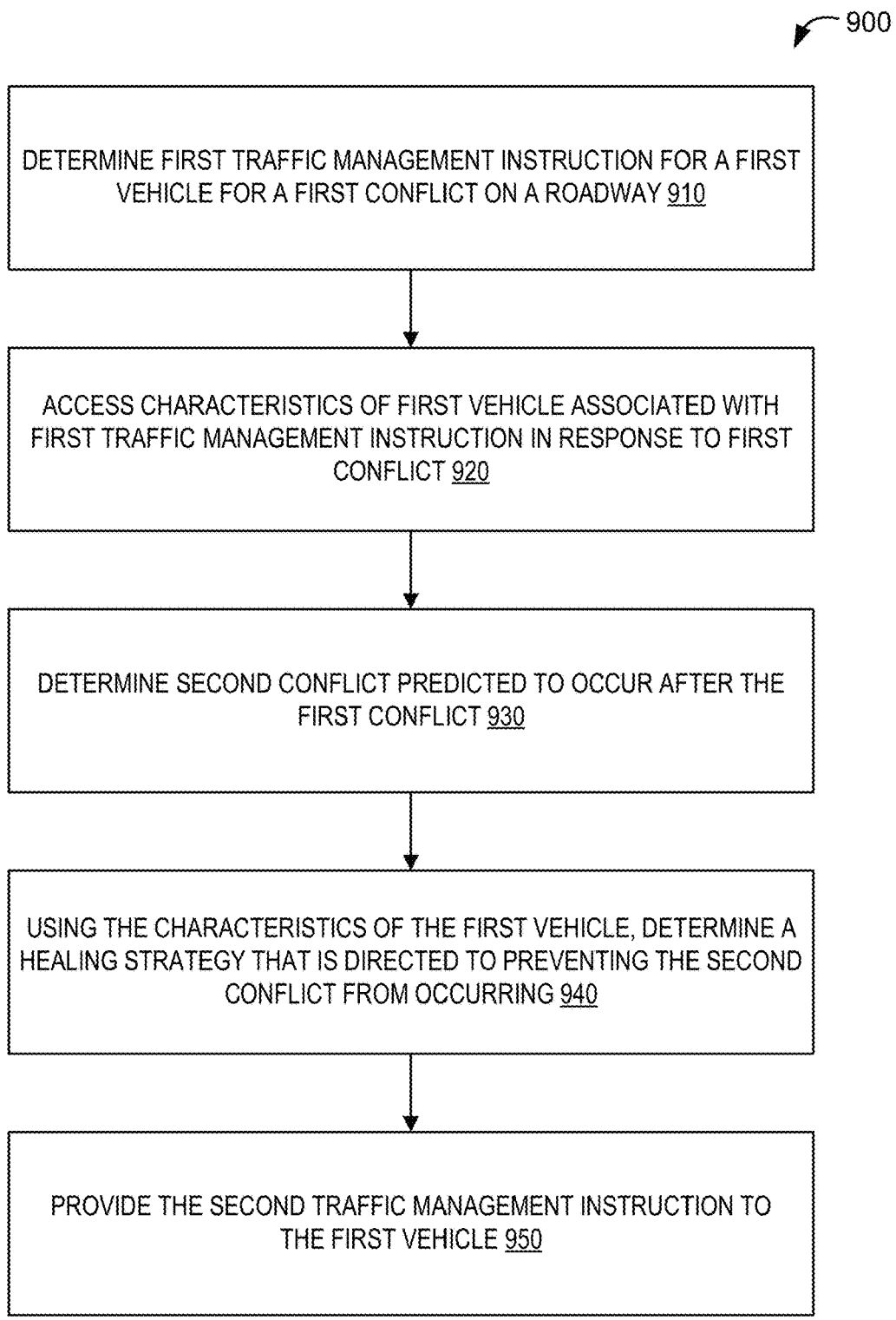
FIG. 9 illustrates an example process that may be used to implement various features of embodiments described in the present disclosure.

FIG. 9 illustrates an example process that may be used to implement various features of embodiments described in the present disclosure. In example 900, the traffic management system may be implemented by server 410 in FIG. 4 or a combination of devices with anomaly managing system 300 illustrated in FIG. 3. The traffic management system may perform a series of operations and transmit instructions to vehicles described herein.

At block 910, the process may determine the first traffic management instruction for a first vehicle for a first conflict on a roadway. The first traffic management instruction may be determined after detecting the first conflict on the roadway. The process may determine and transmit the first traffic management instruction for the first vehicle for the first conflict on the roadway.

At block 920, the process may access characteristics of the first vehicle associated with the first traffic management instruction in response to the first conflict. For example, the process may access characteristics of the first vehicle associated with the first traffic management instruction in response to implementing the first traffic management instruction for the first conflict.

At block 930, the process may determine a second conflict is predicted to occur after the first conflict. For example, after the first conflict is resolved and the first vehicle is outside an impact region of the first conflict, the process may predict that the second conflict will occur after the first conflict that is caused by the implementation of the first traffic management instruction.

At block 940, the process may determine a healing strategy that is directed to preventing the second conflict from occurring. The second traffic management instruction may use the characteristics of the first vehicle or other actions that it performed while responding to the first conflict to determine the healing strategy.

At block 950, the process may provide the second traffic management instruction to the first vehicle. For example, the process may determine and transmit the second traffic management instruction in association with the healing strategy for the first vehicle. The second traffic management instruction may be transmitted in association with traffic management instructions to other vehicles to implement the healing strategy by a group of vehicles.

In some examples, the process may provide instructions to the group of vehicles that have passed the impact region of the first conflict to prevent the second conflict. The instructions to the group of vehicles may be provided concurrently or sequentially with the second traffic management instruction transmitted to the first vehicle.

Figure 10:
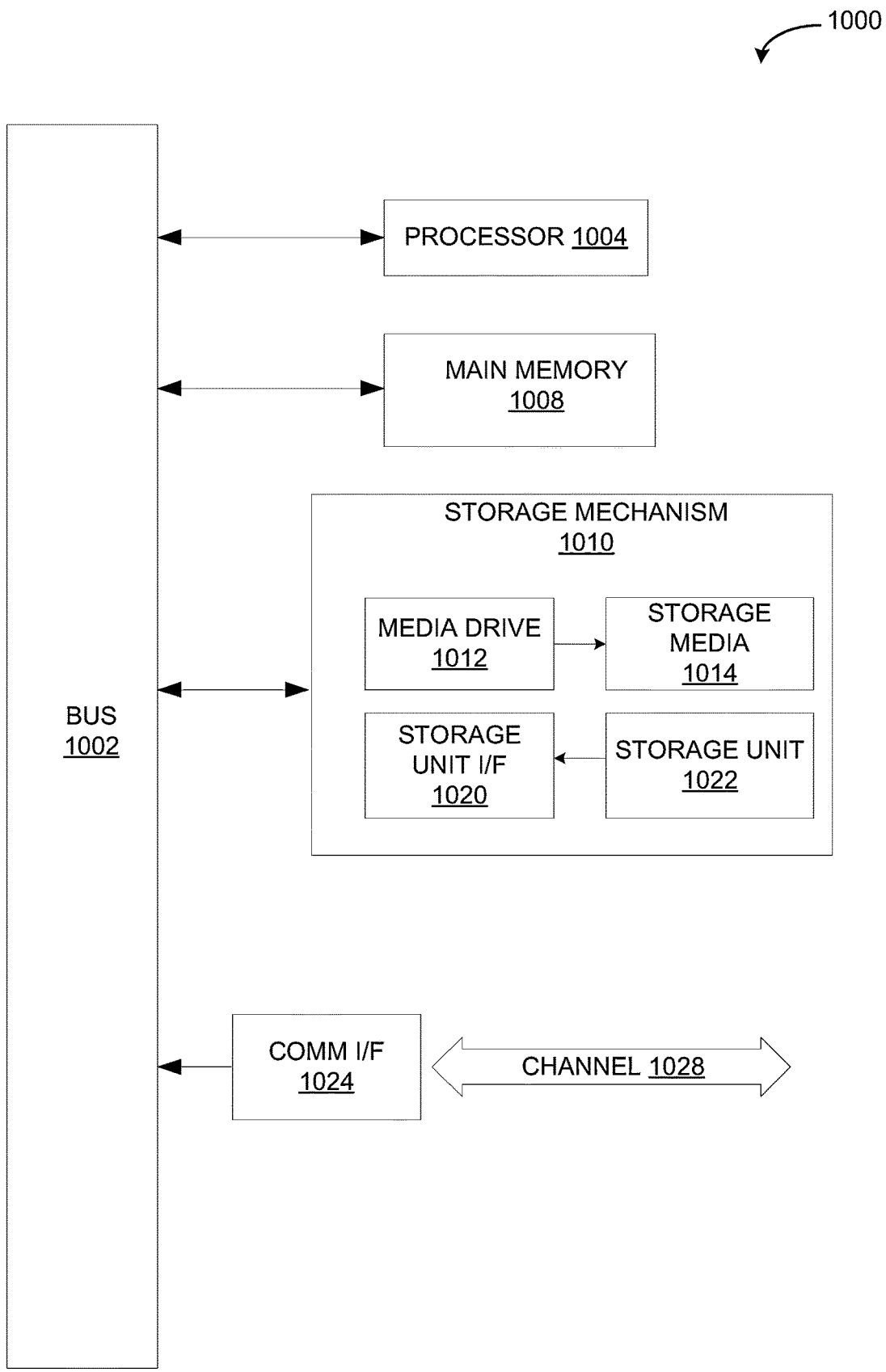
FIG. 10 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 10. Various embodiments are described in terms of this example-computing component 1000. After reading this description, it will become apparent to a person skilled in the relevant art how to implement the application using other computing components or architectures.

Referring now to FIG. 10, computing component 1000 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, portable computing devices, and other electronic devices that might include some form of processing capability.

Computing component 1000 might include, for example, one or more processors, controllers, control components, or other processing devices. This can include a processor, and/or any one or more of the components making up vehicle 100 of FIG. 1, vehicle 200 of FIG. 2, or vehicle 350 or anomaly managing system 300 of FIG. 3. Processor 1004 might be implemented using a general-purpose or special-purpose processing engine such as, for example, a microprocessor, controller, or other control logic. Processor 1004 may be connected to a bus 1002. However, any communication medium can be used to facilitate interaction with other components of computing component 1000 or to communicate externally.

Computing component 1000 might also include one or more memory components, simply referred to herein as main memory 1008. For example, random access memory (RAM) or other dynamic memory, might be used for storing information and instructions to be executed by processor 1004. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

Computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid-state drive, a magnetic tape drive, an optical drive, a compact disc (CD) or digital video disc (DVD) drive (R or RW), or other removable or fixed media drive might be provided. Storage media 1014 might include, for example, a hard disk, an integrated circuit assembly, magnetic tape, cartridge, optical disk, a CD or DVD. Storage media 1014 may be any other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing component 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory component) and memory slot. Other examples may include a PCMCIA slot and card, and other fixed or removable storage units 1022 and interfaces 1020 that allow software and data to be transferred from storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1024 may be carried on signals, which can be electronic, electromagnetic (which includes optical) or other signals capable of being exchanged by a given communications interface 1024. These signals might be provided to communications interface 1024 via a channel 1028. Channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1000 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An traffic management system for programmatically determining traffic management instructions to avoid a second conflict in a roadway after resolving a first conflict on the roadway, the traffic management system comprising:
   a memory; and
   one or more processors that are configured to execute machine readable instructions stored in the memory to:
   detect a first conflict on a roadway for a first vehicle;
   determine and transmit a first traffic management instruction for the first vehicle for the first conflict on the roadway;
   access characteristics of the first vehicle associated with the first traffic management instruction in response to implementing the first traffic management instruction for the first conflict;
   after the first conflict is resolved and the first vehicle is outside an impact region of the first conflict, predict that a second conflict will occur after the first conflict that is caused by the implementation of the first traffic management instruction;

using the characteristics of the first vehicle in responding to the first conflict, determine a healing strategy that is directed to preventing the second conflict from occurring;

determine and transmit a second traffic management instruction in association with the healing strategy for the first vehicle, wherein the second traffic management instruction is transmitted in association with traffic management instructions to other vehicles to implement the healing strategy by a group of vehicles; and provide instructions to the group of vehicles that have passed the impact region of the first conflict to prevent the second conflict.

2. The traffic management system of claim 1, wherein the second traffic management instruction and the instructions to other vehicles are sorted to instruct the vehicles to perform operations in a particular order.

3. The traffic management system of claim 1, wherein the first conflict is caused by a second vehicle, and the second conflict is caused by vehicles responding to an action of the second vehicle.

4. The traffic management system of claim 1, wherein the first conflict is caused by a roadway obstruction, and the second conflict is caused by vehicles responding to the roadway obstruction.

5. The traffic management system of claim 1, wherein the first traffic management instruction and the second traffic management instruction are generated using a healing model of the traffic management system.

6. The traffic management system of claim 1, wherein the characteristics of the first vehicle include a compliance score of the first vehicle in response to the first traffic management instruction.

7. The traffic management system of claim 1, wherein the characteristics of the first vehicle include a driver type of the first vehicle.

8. The traffic management system of claim 1, wherein the characteristics of the first vehicle include a vehicle type of the first vehicle.

9. The traffic management system of claim 1, wherein the second traffic management instruction comprises an instruction to perform a zipper-type healing where one vehicle at a time is directed to return to a lane associated with the first conflict.

10. The traffic management system of claim 1, wherein the second traffic management instruction comprises an instruction to perform a first-applied first-served healing that directs vehicles to return to a lane associated with the first conflict.

11. The traffic management system of claim 1, wherein the second traffic management instruction comprises an instruction to perform an operation to comply with a distance-based healing strategy outside of a location of the first conflict.

12. The traffic management system of claim 1, wherein the second traffic management instruction comprises a sequential-based instruction associated with a compliance score of the first traffic management instruction.

13. A computer-implemented method for programmatically determining traffic management instructions to avoid a second conflict in a roadway after resolving a first conflict on the roadway, the computer-implemented method comprising:

detecting a first conflict on a roadway for a first vehicle;

determining and transmitting a first traffic management instruction for the first vehicle for the first conflict on the roadway;

accessing characteristics of the first vehicle associated with the first traffic management instruction in response to implementing the first traffic management instruction for the first conflict;

after the first conflict is resolved and the first vehicle is outside an impact region of the first conflict, predicting that a second conflict will occur after the first conflict that is caused by the implementation of the first traffic management instruction;

using the characteristics of the first vehicle in responding to the first conflict, determining a healing strategy that is directed to preventing the second conflict from occurring;

determining and transmitting a second traffic management instruction in association with the healing strategy for the first vehicle, wherein the second traffic management instruction is transmitted in association with traffic management instructions to other vehicles to implement the healing strategy by a group of vehicles; and providing instructions to the group of vehicles that have passed the impact region of the first conflict to prevent the second conflict.

14. The computer-implemented method of claim 13, wherein the second traffic management instruction and the instructions to other vehicles are sorted to instruct the vehicles to perform operations in a particular order.

15. The computer-implemented method of claim 13, wherein the first conflict is caused by a second vehicle, and the second conflict is caused by vehicles responding to an action of the second vehicle.

16. The computer-implemented method of claim 13, wherein the first conflict is caused by a roadway obstruction, and the second conflict is caused by vehicles responding to the roadway obstruction.

17. The computer-implemented method of claim 13, wherein the first traffic management instruction and the second traffic management instruction are generated using a trained machine learning model of the traffic management system.

18. The computer-implemented method of claim 13, wherein the characteristics of the first vehicle include a compliance score of the first vehicle in response to the first traffic management instruction.

19. A non-transitory computer-readable storage medium storing a plurality of instructions executable by one or more processors, the plurality of instructions when executed by the one or more processors cause the one or more processors to:

detect a first conflict on a roadway for a first vehicle;

determine and transmit a first traffic management instruction for the first vehicle for the first conflict on the roadway;

access characteristics of the first vehicle associated with the first traffic management instruction in response to implementing the first traffic management instruction for the first conflict;

after the first conflict is resolved and the first vehicle is outside an impact region of the first conflict, predict that a second conflict will occur after the first conflict that is caused by the implementation of the first traffic management instruction;

using the characteristics of the first vehicle in responding to the first conflict, determine a healing strategy that is directed to preventing the second conflict from occurring;

determine and transmit a second traffic management instruction in association with the healing strategy for the first vehicle, wherein the second traffic management instruction is transmitted in association with traffic management instructions to other vehicles to implement the healing strategy by a group of vehicles; and provide instructions to the group of vehicles that have passed the impact region of the first conflict to prevent the second conflict.

20. The non-transitory computer-readable storage medium of claim 19, wherein the second traffic management instruction and the instructions to other vehicles are sorted to instruct the vehicles to perform operations in a particular order.

\* \* \* \* \*